(12) United States Patent
Wang et al.

(10) Patent No.: US 8,480,317 B2
(45) Date of Patent: Jul. 9, 2013

(54) FIXING STRUCTURE OF SURVEILLANCE DEVICE

(75) Inventors: Shao-Hung Wang, New Taipei (TW); Feng-Yang Ma, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 0 days.

(21) Appl. No.: 13/467,057

(22) Filed: May 9, 2012

(65) Prior Publication Data

US 2013/0114950 A1    May 9, 2013

(30) Foreign Application Priority Data

Nov. 3, 2011    (TW) .............................. 100140059 A

(51) Int. Cl.
*G03B 17/00*    (2006.01)
(52) U.S. Cl.
USPC ......................................................... 396/427

(58) Field of Classification Search
USPC ................... 396/419, 427, 428; 348/143, 151, 348/373–376; 248/187.1
See application file for complete search history.

(56) References Cited

U.S. PATENT DOCUMENTS 4,945,367 A * 7/1990 Blackshear .................... 396/427
7,651,281 B2 * 1/2010 Wen .............................. 396/427

* cited by examiner

*Primary Examiner* — W B Perkey
*Assistant Examiner* — Minh Phan
(74) *Attorney, Agent, or Firm* — Altis Law Group, Inc.

(57) ABSTRACT

A fixing structure of a surveillance device includes a monitor and a secure board. The monitor has a plurality of clips and an alignment gap on a bottom surface of the monitor. The clips are engaged to a plurality of engagement openings of the secure board. The secure board has an alignment flake configured to be inserted into the alignment gap. The alignment gap is engaged with a block element to limit the movement of the alignment flake and to maintain a strong and inflexible connection between the monitor and the secure board.

9 Claims, 5 Drawing Sheets

FIXING STRUCTURE OF SURVEILLANCE DEVICE

BACKGROUND

1. Technical Field

The disclosure is related to a fixing structure of a surveillance device, and particularly to a fixing structure capable of avoiding loosening caused by vibration or external forces.

2. Description of Related Art

Surveillance devices are commonly used to monitor various areas in a place of business, such as cashier windows at a bank. Lens modules are the main component of surveillance devices. Lens modules are on a mechanism that allows the cameras to rotate on an axis to expand the angular field of view and tilt to adjust the angle of the camera's view. To achieve a clear image, surveillance devices need to be installed tightly. Current surveillance devices are secured by complex structures including supporting stands and many parts for fixation. It is desired to assemble surveillance devices with an easier mechanism.

BRIEF DESCRIPTION OF THE DRAWINGS

The components in the drawings are not necessarily drawn to scale, the emphasis instead being placed upon clearly illustrating the principles of a fixing structure of a surveillance device. Moreover, in the drawings, like reference numerals designate corresponding parts throughout the several views.

DETAILED DESCRIPTION

The invention will be described with references to the accompanying diagrams.

Figure 1:
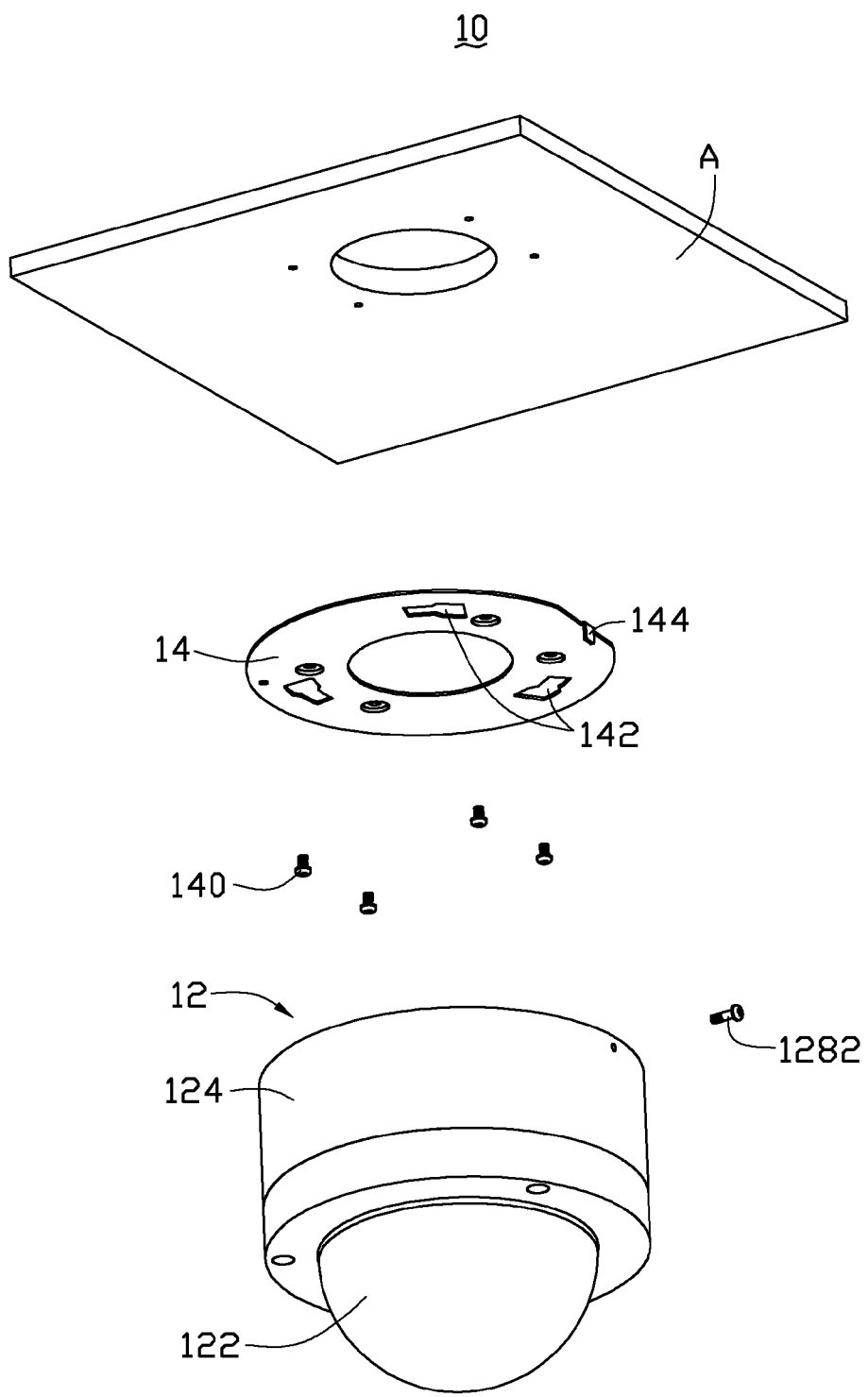
FIG. 1 illustrates a schematic diagram of a fixing structure of a surveillance device

FIG. 1 shows a fixing structure of a surveillance device 10 of the disclosure. The fixing structure of the surveillance device 10 includes a monitor 12 and a secure board 14. The monitor 12 includes a lens module 122 and fixed base 124. The lens module 122 includes an adjustable base and an image lens disposed on the adjustable base (not shown). The adjustable base is disposed on the fixed base 124. The adjustable base may be rotated multiaxially on the fixed base 124. The rotation of the adjustable base 124 expands the image capture region of the image lens. In the present disclosure, the secure board 14 is bolted to a ceiling A by ceiling screws 140. The monitor 12 is mounted on the secure board 14 by engaging a clipping device on a bottom surface of the fixed base 124 to the secure board 14.

Figure 2:
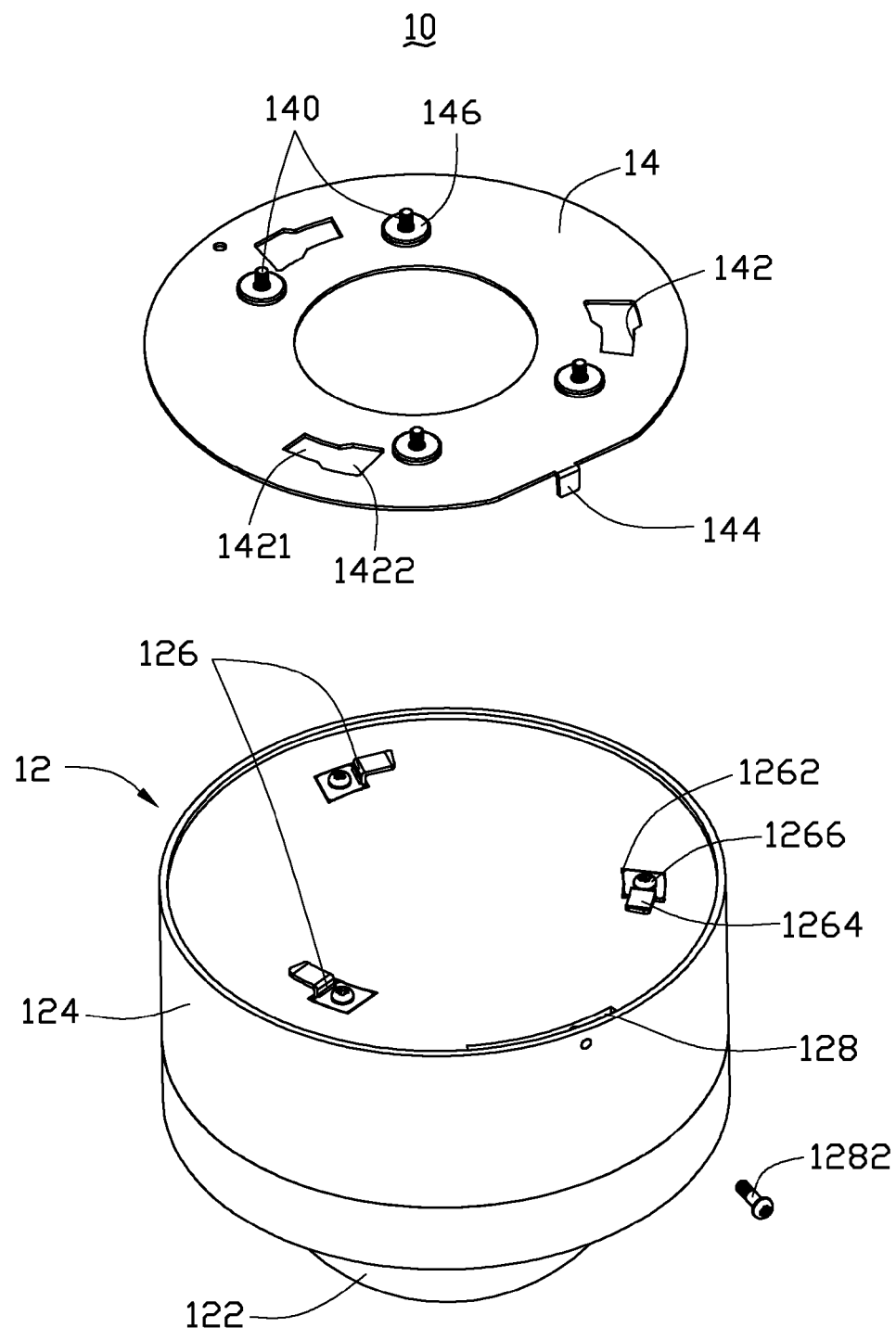
FIG. 2 is illustrates a schematic diagram of a monitor and a secure board of the surveillance device.

Please refer to FIG. 2. The clipping device of the monitor 12 includes a plurality of clips 126 and an alignment flake 128 on the bottom surface of the fixed base 124. The fixed base 124 of the present embodiment is a round-shaped base. The clips 126 are arranged as vertices of an isogonal triangle disposed on the bottom surface of the fixed base 124. Each of the clips 126 has a step-like structure configured by a fixing part 1262 and an engagement part 1264 extended from an end of the fixing part 1262. The fixing part 1262 is secured on the bottom surface of the fixed base 124 by a fixation screw 1266. The engagement part 1264 is suspended and positioned above the bottom surface of the fixed base 124. The fixing part 1262 has a larger area than the engagement part 1264. The alignment gap 124 is a recess at an inner surface of a rim of the fixed base 124. A block element 1282 is provided to limit the movement of the clipping device engaged with the secure board 14 and to maintain a strong and inflexible strength between the monitor 12 and the secure board 14. In the present embodiment, the block element 1282 is a block screw, which is inserted in the fixed base 124 from an outer surface of the rim of the fixed base 124 to the inner surface of the rim of the fixed base 124.

Figure 3:
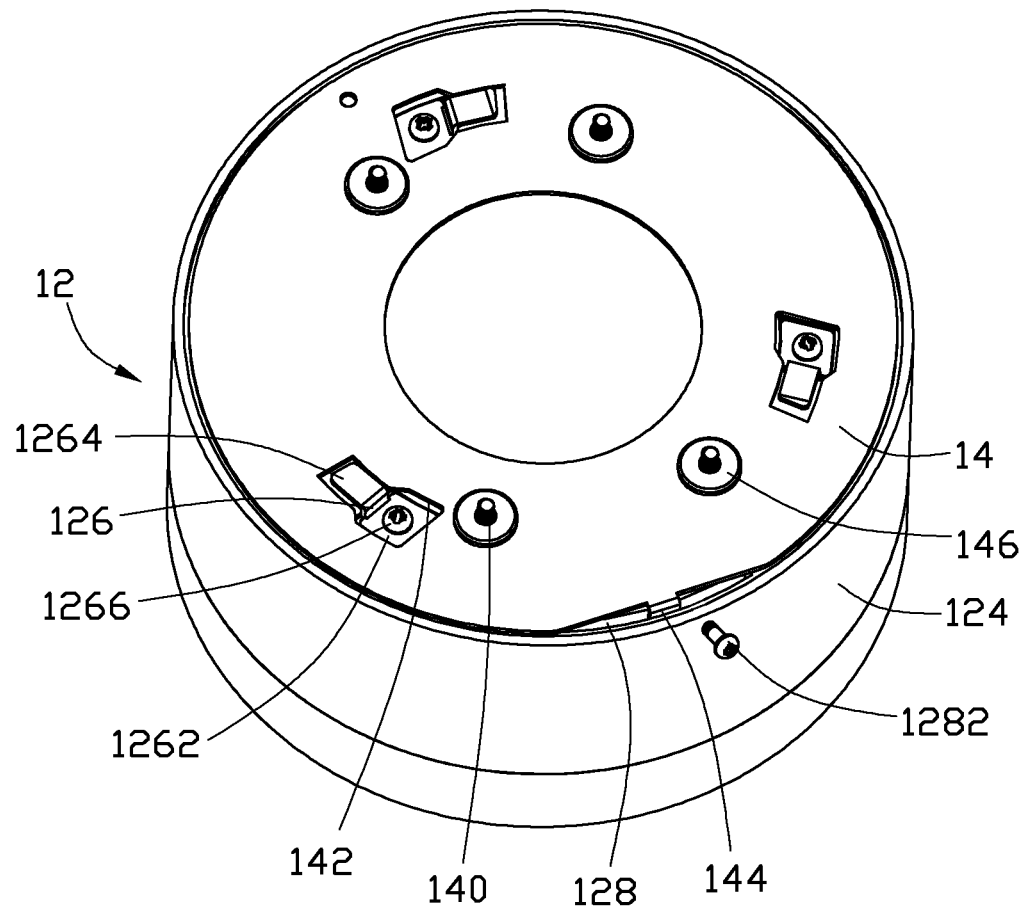
FIG. 3 is a schematic diagram showing engagement of the secure board and the monitor in FIG. 1.
Figure 4:
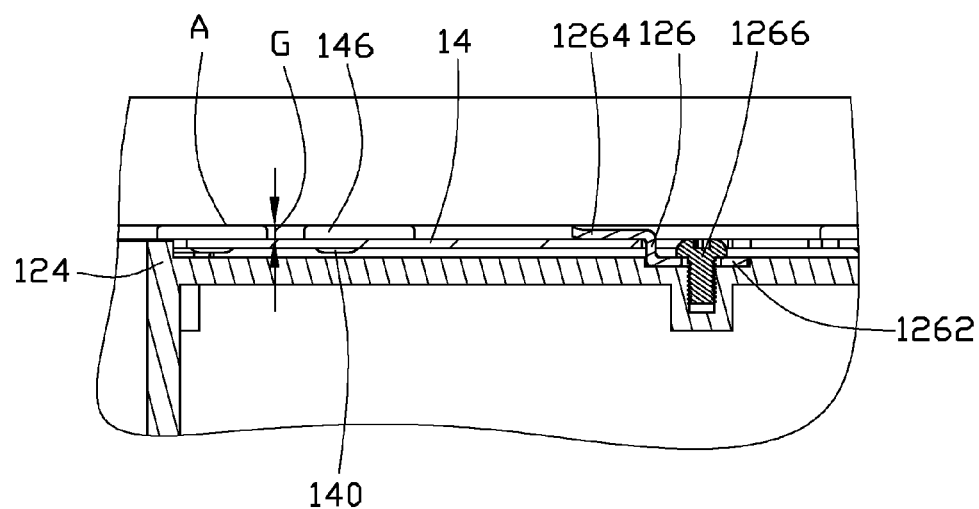
FIG. 4 is a cross-sectional diagram of FIG. 1 showing the fixing structure of the surveillance device.
Figure 5:
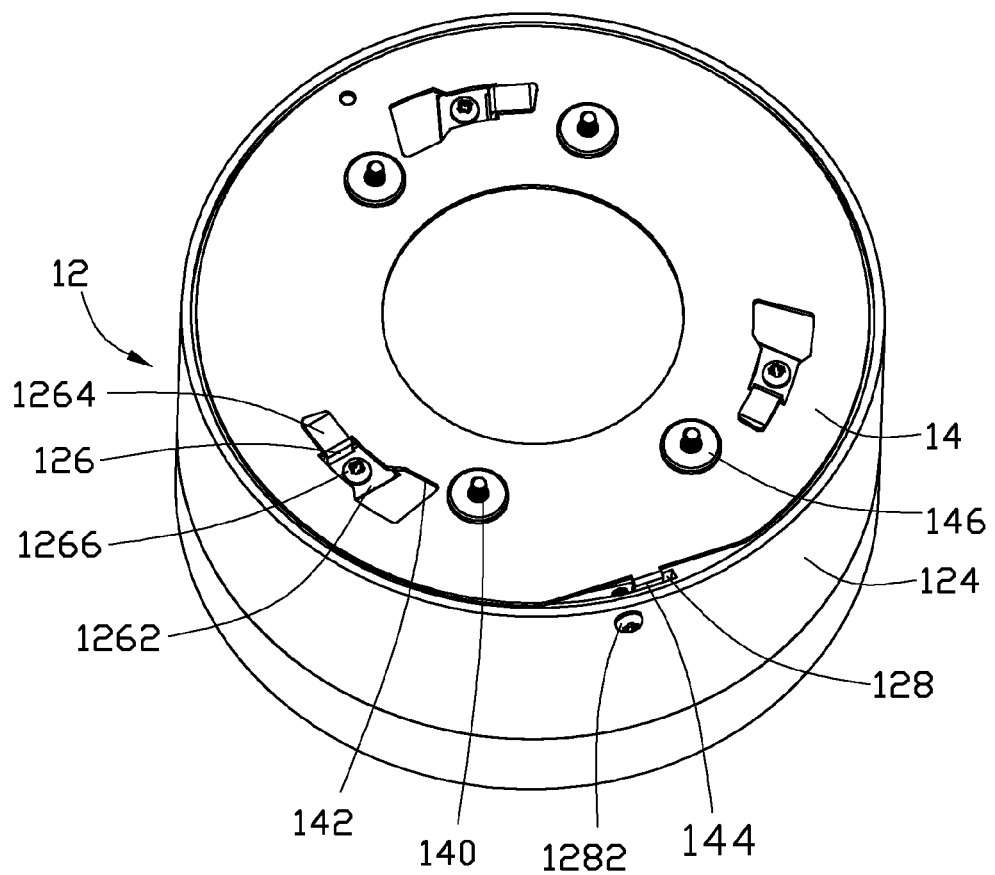
FIG. 5 is a schematic diagram showing the engagement of an alignment flake and an alignment gap in FIG. 1.

The secure board 14 has a plurality of engagement openings 142 and an alignment flake 144 extended from the edge of the secure board 14. The engagement openings 142 are arranged as vertices of an isogonal triangle and corresponding to the clips 126 on the bottom surface of the fixed base 14. The number and the pattern of the clips 126 and the engagement openings 142 may be modified as required. The configuration of the engagement openings 142 is corresponding to the configuration of the clips 126. Each engagement opening 142 is bell-shaped that includes a bottom portion 1421 and a top portion 1422. The bottom portion 1422 of engagement opening 142 has a greater enclosed area than the top portion 1421. The bottom portion 1422 of the engagement opening 142 corresponds to the fixing part 1262 of the clip 126. The top portion 1421 of the engagement opening 142 corresponds to the engagement part 1264 of the clip 126, respectively. When the fixed base 124 of the monitor 12 is mounted to the secure board 14, the engagement openings 142 and the clips 126 are overlapped (see FIG. 3). The engagement part 1264 of the clips are enclosed by the top portions 1421 of the clips 142, and the fixing parts 1262 of the clips 126 are enclosed by the bottom portions 1422 of the clips 142, respectively. The alignment flake 144 is extended from the edge of the secure board 14 to the fixed base 124 of the monitor 12. When the fixed base 124 and the secure board 14 are engaged, the clips 126 are engaged with the engagement openings 142 and the alignment flake 144 is inserted into the alignment gap 128. A plurality of pads 146 are disposed on a top surface of the secure board 14 facing the ceiling A. Each pad 146 has a predetermined thickness that is greater than the thickness of the engagement part 1264 of each clip 126. These pads 146 are inserted by the ceiling screws 140 and sandwiched between the secure board 14 and the ceiling A. In the present embodiment, the ceiling screws 140 are arranged as vertices of a square around the center of the secure board 140 to fasten the secure board 14 to the ceiling A. The pads 146 serve as buffers between the ceiling A and the secure board 14. Since the pads 146 have the same thickness, a space G is formed between the secure board 14 and the ceiling A to contain the engagement parts 1264 of the clips 126 (see FIG. 4).

When the engagement device of the monitor 12 is engaged with the secure board 14, the clips 126 are configured to the engagement openings 142. The engagement parts 1264 are hooked on the secure board 14 over the engagement openings 142 and positioned in the space G between the secure board 14 and the ceiling A. The alignment flake 144 is inserted into the alignment gap 128. The fixed base 124 is rotated to lock the clips 126 and the secure board 14. The position of the alignment flake 144 is shifted and placed at one end of the engagement gap 128. The block element 1282, such as the block screw, is inserted from the outer surface of the rim of the fixed base 124 to the inner surface of the rim of the fixed base 124 to limit the movement of the alignment flake 144 in the end of the alignment gap 128. The clips 126 of the fixed base 124 are consequently locked with the secured board 14. Occasional external forces and vibration applied to the locked monitor 12 can not easily loosen the engagement of the monitor 12 and the secure board 14. To release the monitor 12 from the secure board 14, the block element 1282, for example the block screw of the present embodiment, should be removed from the alignment gap 128 and the fixed base 124 to release the alignment flake 144. Therefore, the fixed base 124 of the monitor 12 may be rotated to unlock the clips 126 from the engagement openings 142 of the secure board 14.

The fixing structure of the surveillance device 10 of the disclosure has the alignment flake 144 and the engagement openings 142 on the secure board 14 to engage with the engagement gap 128 and the clips 126 on the monitor 12. When the monitor 12 is locked to the secure board 14, the movement of the alignment flake 144 is limited by the block element 1282 that prevents loosening caused by vibration or external forces. The fixing structure of the disclosure has advantages of ease of assembly, low cost, and good performance.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. A fixing structure of a surveillance device comprising:
   a monitor comprising a fixed base and a plurality of clips and defining an alignment gap, the clips and the alignment gap positioned on a bottom surface of the fixed base; and
   a secure board comprising:
      a plurality of engagement openings engaged to the clips; and
      an alignment flake inserted into the alignment gap;
   wherein the movement of the alignment flake is limited by a block element, the alignment gap is defined in an inner surface of a rim of the fixed base, and the block element comprises a blocking screw inserting the alignment gap from an outer surface of the rim to the inner surface of the rim.

2. The fixing structure of the claim 1, wherein each clip comprises a step-like structure and comprises:
   a fixing part fixed on the bottom surface of the fixed base by a fixation screw; and
   an engagement part extended from the fixing part and suspended above the bottom surface of the fixed base.

3. The fixing structure of the claim 2, wherein the fixing part has a larger area than the engagement part.

4. The fixing structure of the claim 1, wherein each engagement opening is bell-shaped to engage with the clip.

5. The fixing structure of claim 4, wherein each engagement opening comprises a top portion and a bottom portion, the bottom portion having a greater enclosed area than the top portion.

6. The fixing structure of the claim 1, wherein the alignment flake extends from the edge of the secure board to the fixed base of the monitor.

7. The fixing structure of the claim 2, wherein the secure board comprises a plurality of pads on a top surface facing a ceiling, and each pad has a thickness greater than the engagement part of the clip.

8. The fixing structure of the claim 7, wherein the secure board is fixed to the ceiling by ceiling screws inserting into the pads, and a space is formed between the secure board and the ceiling.

9. The fixing structure of the claim 8, wherein the engagement parts of the clips are received in the space.

* * * * *